United States Patent [19]

Nagase et al.

[11] Patent Number: 4,517,087
[45] Date of Patent: May 14, 1985

[54] FILTRATION/SEPARATION APPARATUS

[75] Inventors: Hyosuke Nagase, 21-11, Josai-3-chome, Nishi-ku, Nagoya; Tetsuya Sato, Yachiyo; Kazuo Kobayashi, Chiba; Norio Masumoto, Ichinomiya; Yuji Nagase, Nagoya, all of Japan

[73] Assignees: Hitachi, Ltd.; Hyosuke Nagase, both of Tokyo, Japan

[21] Appl. No.: 539,389

[22] Filed: Oct. 6, 1983

[30] Foreign Application Priority Data

Oct. 6, 1982 [JP] Japan .................. 57-174571

[51] Int. Cl.³ ............................................ B01D 33/04
[52] U.S. Cl. .................................... 210/396; 210/401; 99/458; 99/465; 99/495; 100/177
[58] Field of Search ............... 100/177, 178; 210/386, 210/391, 396, 397, 400, 401; 99/458, 465, 495

[56] References Cited

U.S. PATENT DOCUMENTS

| 461,232 | 10/1891 | Birch | 210/386 |
|---|---|---|---|
| 2,121,932 | 6/1938 | Slocum | 100/177 |
| 2,631,527 | 3/1953 | Mack | 100/178 |
| 3,279,357 | 10/1966 | Farmer | 100/177 |
| 3,849,043 | 11/1974 | Doering | 100/177 |
| 3,889,588 | 6/1975 | Wollersheim | 100/177 |
| 4,146,484 | 3/1979 | Campbell | 210/396 |
| 4,206,056 | 6/1980 | Nagase | 210/401 |
| 4,261,827 | 4/1981 | Bronnec | 210/400 |
| 4,273,655 | 6/1981 | Reid | 210/398 |

FOREIGN PATENT DOCUMENTS 823980   7/1949   Fed. Rep. of Germany ...... 100/177

Primary Examiner—Ernest G. Therkorn
Attorney, Agent, or Firm—Antonelli, Terry & Wands

[57] ABSTRACT

A filtration/separation apparatus in which a filter cloth is arranged to travel and face a rotor so that a partitioned space chamber defined by the cloth and rotor is gradually narrowed in accordance with the rotation of the rotor. The space chamber defined is partitioned by vanes provided on the rotor, so that the positional relations in contact between the tip ends of the vanes and the filter cloth are maintained desirable with a high accuracy.

10 Claims, 13 Drawing Figures

FILTRATION/SEPARATION APPARATUS

BACKGROUND OF THE INVENTION

This invention relates to a filtration/separation apparatus used primarily for dehydrating bean jam or squeezing a soy sauce or bean milk, though its application is not specifically limited to food-stuffs.

There has heretofore been known from, for example, Japanese Patent Application Laid-Open No. 150415/1982 filed by the present applicants, a filtration/separation apparatus including a rotor having a plurality of vanes radially provided thereon, and a filter cloth arranged to be fed around the rotor to form an eccentric arc with respect to a center of rotation of the rotor whereby a material to be processed is fed between the filter cloth and the rotor and is discharged from a part where a space between the filter cloth and the rotor is narrower than that at the feeding part.

However, in accordance with the conventional filtration/separation apparatus, it would be impossible to keep desirable contact positional relations between tip ends of the vanes and the filter cloth, and it would be difficult to obtain satisfactory filtration or dehydration effect. An example of this type will be explained in more detail with reference to FIG. 1, in which a cylindrical rotor 1 is adapted to rotate about a first center $P_1$ and is provided with a plurality of radially retractable vanes 2. An arcuate support means 3 has a second center $P_2$ which is eccentric with respect to the first center $P_1$. A filter cloth 4 is arranged between the rotor 1 and the support means 3. The filter cloth 4 is adapted to pass along an outer surface of the support means 3 on the arc having the center $P_2$. Rollers 5 and 6 are used for folding back the filter cloth. A hopper 7 is provided for feeding a material to be processed between the rotor 1 and the filter cloth 4. A stripper or blade 8 is provided for scraping the material stuck on the filter cloth 4. Incidentally, it is apparent that a pair of side plates (not shown) are provided to close portions which extend at least from a supply port 9 of the hopper 7 to a take-out port 10 for the material to be processed as viewed in the rotational direction $F_1$ of the rotor 1 and are defined by opposed end portions of the rotor 1 and opposed end portions of the filter cloth 4. With such a construction, when the rotor 1 is rotated in the direction $F_1$ while the filter cloth 4 is fed in the direction $F_2$ and the material to be processed is fed from the hopper 7, the space chamber A defined by the space between the cylindrical surface of the rotor 1 and the filter cloth 4 and the pair of side plates is gradually narrowed in accordance with the rotation of the rotor 1. Therefore, a pressure in the space chamber A is increased, and if the filter cloth 4 is used for the purpose of dehydrating, water components contained in the material to be processed are filtrated or removed through the filter cloth 4 to the outside of the space chamber A. As a result, the material which has been dehydrated is discharged from the take-out port 10.

However, in the filtration/separation apparatus with such a construction, since a distance between the tip ends of the adjacent vanes 2 (for example, distances $L_1$ or $L_2$) is gradually decreased according to the advance of process, the position where the tip end of the vane contacts with the filter cloth 4 would be changed, and the filter cloth would be loosened, so that an excess filter cloth portion would be folded since a relatively high pressure is applied to the interior of the space chamber A. In other words, there is a fear that when the position where the tip end of the vane 2 contacts with the filter cloth 4 is displaced, the filter cloth 4 and the tip end of the vane 2 would be damaged or abraded. In addition, since the material to be processed tends to be leaked from the higher pressure space A to the lower pressure space A due to the displacement of the contact position, it would be difficult to maintain a high dehydration efficiency (or filtration efficiency). Moreover, if the loosening or folding is generated in the filter cloth 4, this part would be damaged or abraded, so that it would be difficult to provide a long service life of the filter cloth 4.

SUMMARY OF THE INVENTION

Accordingly, a primary object of the invention is to provide a filtration/separation apparatus enabling the attainment of a continuous effective dehydration/filtration process by keeping accurate positional relations in contact between the tip ends of the vanes and the filter cloth upon compression of a material to be processed.

In accordance with the invention, in order to attain the above-described object, there is provided a filtration/separation apparatus in which a filter cloth is arranged to travel and face the rotor so that a partitioned space chamber defined by the cloth and the rotor is gradually narrowed in accordance with the rotation of the rotor, and the space chamber defined by the cloth and the rotor is partitioned by vanes provided on the rotor, so that the positional relations in contact between the tip ends of the vanes and the filter cloth are maintained desirable with a high accuracy.

Constructions, features and advantages of the invention will become apparent by the accompanying drawings and the following descriptions.

DESCRIPTION OF THE PREFERRED EMBODIMENTS

Figure 1:
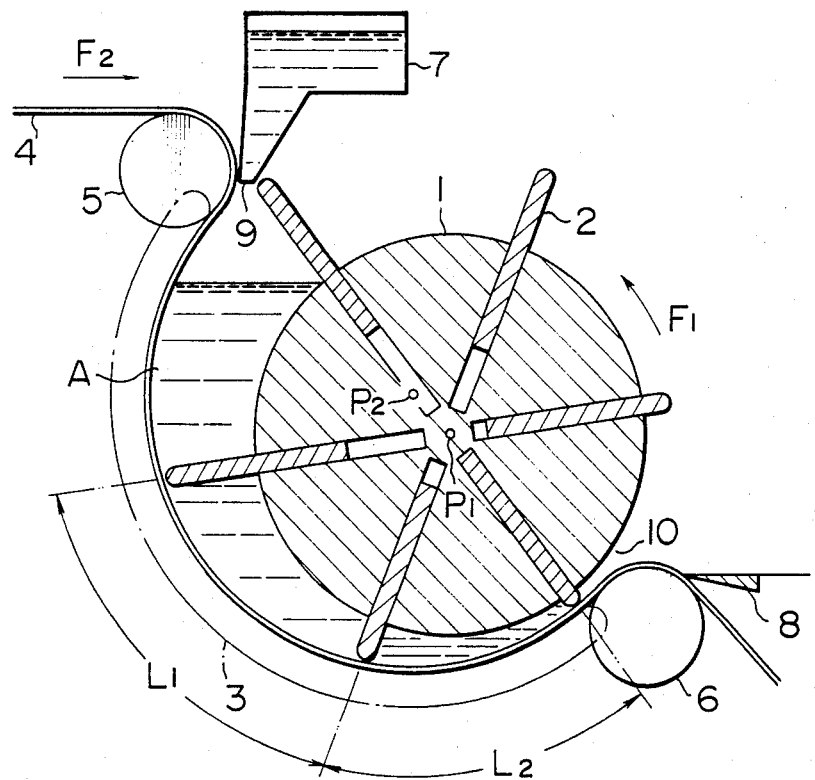
FIG. 1 is a schematic view illustrating a construction of a conventional filtration/separation apparatus.
Figure 2:
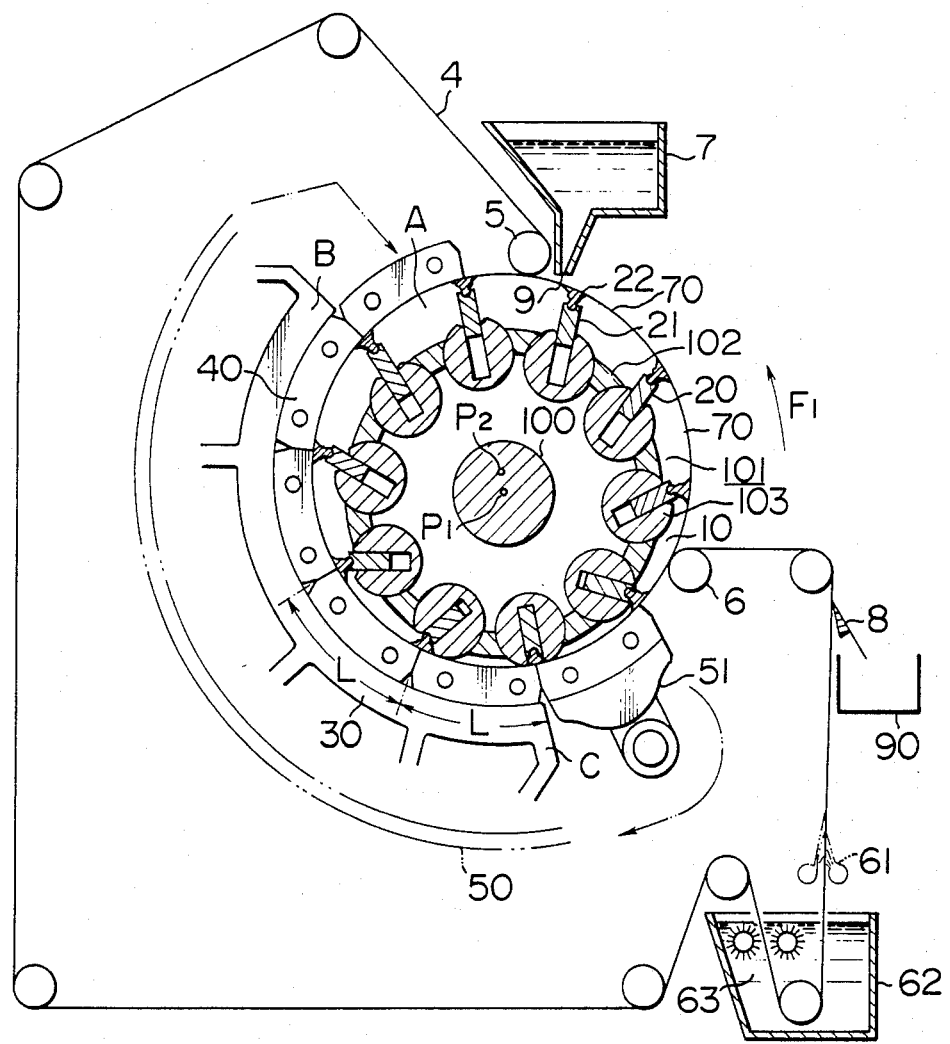
FIG. 2 is a schematic view illustrating a construction of a primary part of one embodiment of the invention.

One embodiment of the invention will now be described with reference to FIG. 2. A rotary shaft 100 is rotatably supported by a bearing means later described. The rotary shaft 100 is rotated about a first center $P_1$. A rotor 101 is mounted on the rotary shaft 100 and is provided with a cylindrical surface 102 having the first center $P_1$ as its center with a number of vane supports 103 provided therein. Each vane support 103 rotatably supports a base end 21 of each vane 20 retractably from and into the cylindrical surface 102 of the rotor 101. An arcuate guide 30 has a second center $P_2$ eccentric with respect to the first center $P_1$. A plurality of frame segments or pieces 40 coupled to each other are movably supported along the guide 30 while facing the rotor 101. On the backside of the guide 30, there is formed a frame segment guide chute 50. A frame segment governing mechanism 51 is provided for picking up the frame segments 40 from the guide 30 and delivering them into the guide chute 50. The frame segment governing mechanism 51 forms a frame segment feed-back device together with the frame segment guide chute 50. In other words, the frame segment 40 fed out of a terminal end C of the guide 30 is received by the frame segment governing mechanism 51 and is moved into the frame segment guide chute 50. Thereafter, the frame segment 40 is delivered toward the starting end B of the guide 30 along the guide chute 50, and is fed to the guide 30 from the starting end B of the guide 30 by means of a mechanism which is similar to the frame segment governing mechanism 51. Accordingly, the frame segments 40 coupled to each other are arranged on the guide 30 so as to face the rotor 101.

A filter cloth 4 is arranged between the rotor 101 and the frame segments 40 disposed on the guide 30. The filter cloth 4 is guided to pass through a backside of the frame segment feed-back device in an endless manner. Along the guide path of the filter cloth 4, there are provided a shower means 61 and a washing tank 62 for washing the filter cloth 4, and a pair of washing brushes 63 clamping the filter cloth 4. The material processed that sticks to the filter cloth 4 is scraped by a stripper or blade 8 and the scraped material is stored in a material receiving device 90. A space or gap between both ends of the rotor 101 and both ends of the filter cloth 4 is sealed at both sides by a pair of side plates 70 which rotate about the second center $P_2$. A tip end 22 of each vane 20 is constructed to be rotatable with respect to the vane body. With such a construction that the tip end 22 of the vane 20 is made rotatable with respect to the vane body and the base end of the vane 20 is made retractable and rotatable, with respect to the rotor 101, it is possible to maintain constant a distance L between each of the adjacent tip ends 22 of the vanes 20. Drive means is required to permit the frame segments 40 on the guide 30, the filter cloth 4 and the tip ends 22 of the vanes 20 to be moved along the guide 30 while maintaining their positional relations. For this purpose, a gear mechanism or other various timing belt mechanisms well known per se in the art may be used.

The operation of the thus constructed filtration/separation apparatus will now be described. First of all, when the operation of the filtration/separation apparatus is started (the rotor 101 is rotated in the direction $F_1$) while a material to be processed, such as a liquid material of bean jam is fed from the supply port 9 of the hopper 7 to the gap between the rotor 101 and the filter cloth 4, which gap is partitioned by the vanes into a plurality of spaces. The volume of the space chamber A surrounded by the filter cloth 4, the vanes 20, the rotor 101 and the side plates 70 is gradually decreased toward the take-out port 10 for the material to be processed. Accordingly, the pressure in the space chamber A is gradually increased, so that a dehydration or filtration process is conducted through the filter cloth 4. At this time, the frame segments 40, the filter cloth 4 and the tip ends 22 of the vanes 20 travel at the same speed (more exactly, the same angular speed) along the arc of the guide 30 about the second center $P_2$ in mutual contact positional relations. The vanes 20 are rotated while extending or retracting with respect to the rotor 101 in order to absorb or compensate for the displacement distance between the filter cloth 4 and the rotor 101. The frame segments 40 picked up from the terminal end C of the guide 30 by the operation of the filtration/separation apparatus are again fed to the start end B of the guide 30 by the action of the frame segment feed-back device. The filter cloth 4 which is pressure-released after passage of the terminal end C of the guide 30 is folded back by the roller 6 and is separated from the rotor 101. The processed material such as bean jam stuck on the filter cloth 4 and delivered out is scraped by the stripper 8 and is stored in the material receiving device 90. Further, the filter cloth 4 is made to pass through the shower means 61 and the washing tank 62 to be washed or cleaned, then it is again fed from the starting end B of the guide 30.

In the thus constructed filtration/separation apparatus of the embodiment, since such a positional relation is established between the filter cloth 4 and the tip ends 22 of the vanes 22 that the tip end 22 of each vane is always contacted with the filter cloth 4 in the normal direction with respect thereto and such a positional relation is kept during the compression stroke of the material to be processed (dehydration or filtration process), it is possible to prevent a damage of the filter cloth 4 or the tip end of the vane 20 and in addition, it is possible to prevent a leakage of the material to be processed through a partitioning portion between the filter cloth 4 and the tip end 22 of the vane 22 from a higher pressure side to a lower pressure side of the adjacent space chambers A. Also, there is no fear that the filter cloth 4 would be loosened or folded, and therefore, a load or burden imposed on the filter cloth 4 may be decreased thereby to elongate its service life.

Figure 3:
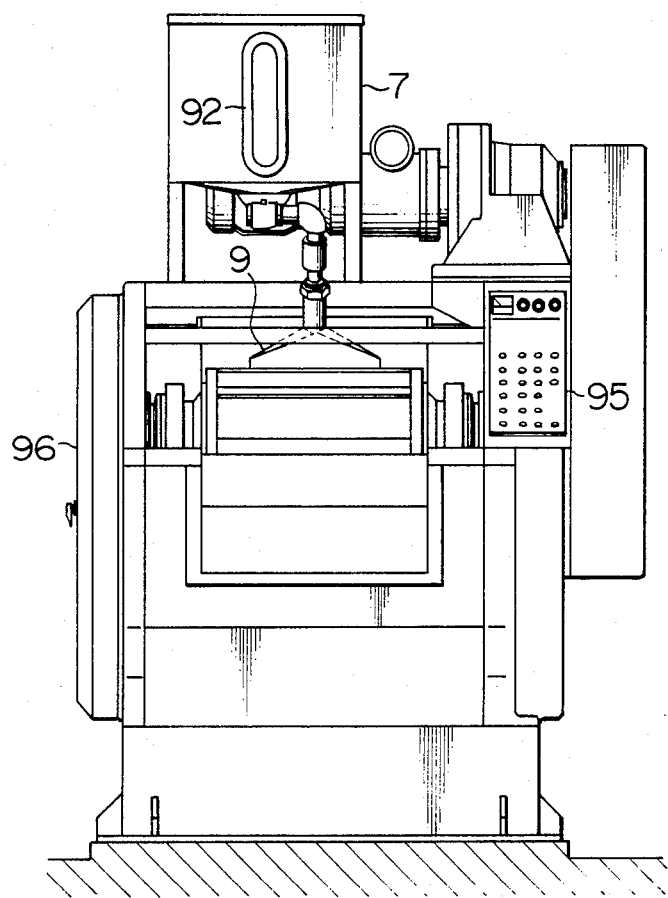
FIG. 3 is a frontal view showing the filtration/separation apparatus of the embodiment of FIG. 2.
Figure 4:
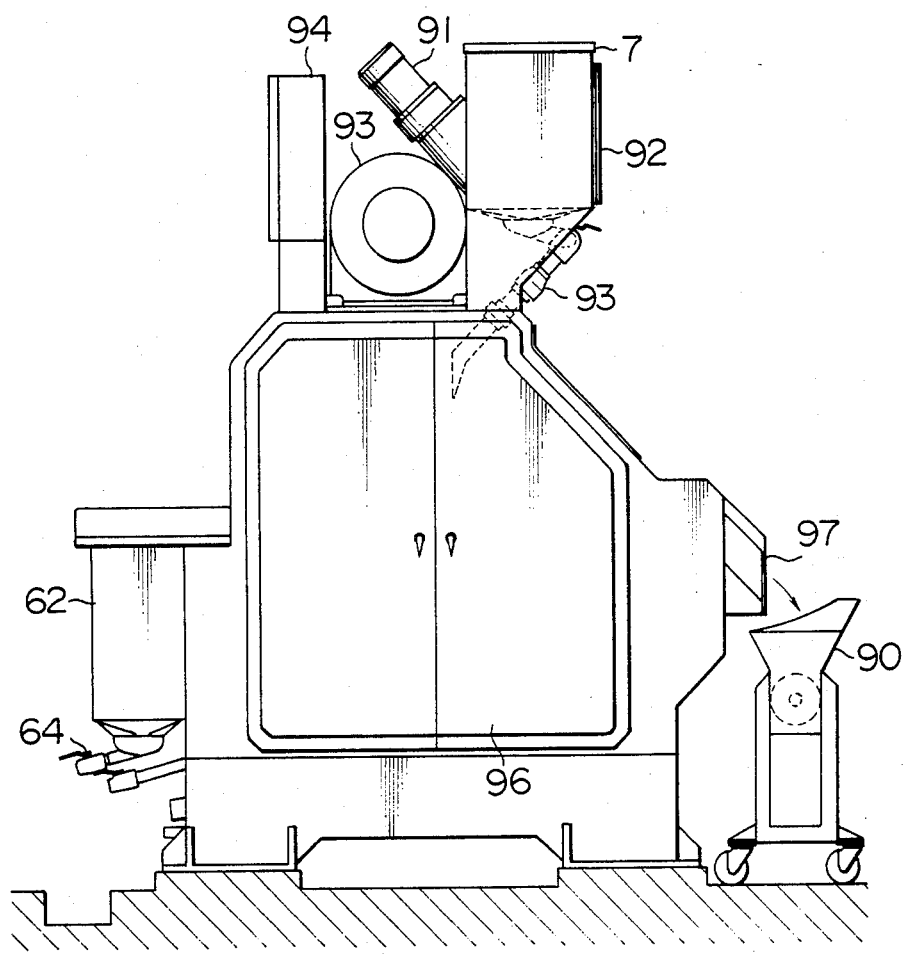
FIG. 4 is a side-elevational view showing the filtration/separation apparatus of the embodiment.
Figure 5:
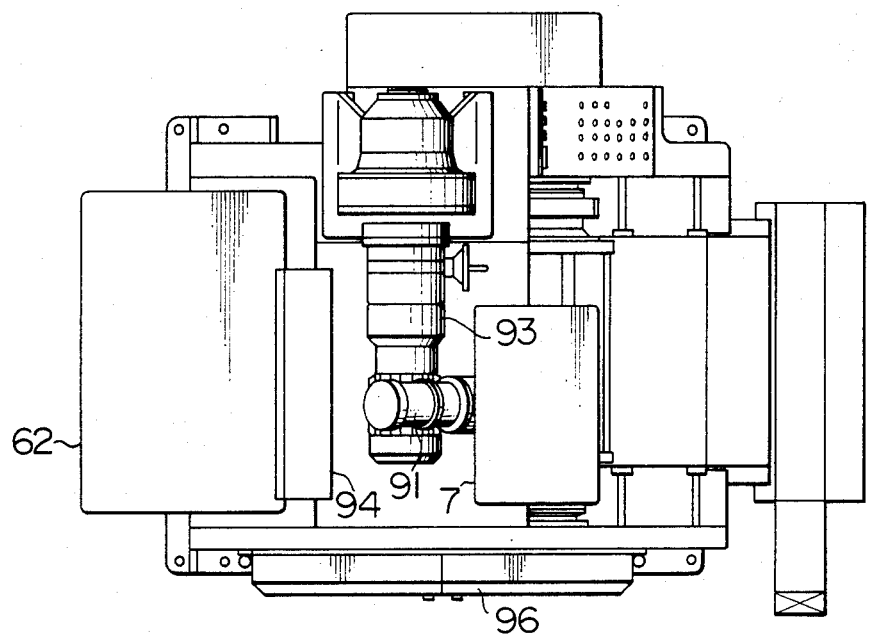
FIG. 5 is a plan view showing the filtration/separation apparatus of the embodiment.

The entire construction of the apparatus of the embodiment will now be described. FIGS. 3, 4 and 5 show front, side elevational and plan views of the filtration/separation apparatus of the embodiment, respectively. Referring to these figures, the hopper 7 for feeding material to be processed into the filtration/separation apparatus is disposed at the uppermost portion of the filtration/separation apparatus and is comprised of an agitating device 91 for agitating or mixing the material to be processed in the hopper 7, a window for visually confirming the amount of the material and a supply port 9 for feeding the material to be processed from the hopper 7. Also, on the upper portion of the filtration/separation apparatus, there are disposed a main electric drive motor 93 with a reduction gear mechanism and a relay box 94. A control panel 95 is mounted on the front side of the filtration/separation apparatus. A pair of doors 96 are provided for use in maintenance or inspection work. The washing tank 62 is provided with a drain discharge nozzle 64. The material to be processed is taken out through a guide port 97 to the above described material receiving device 90.

Figure 6:
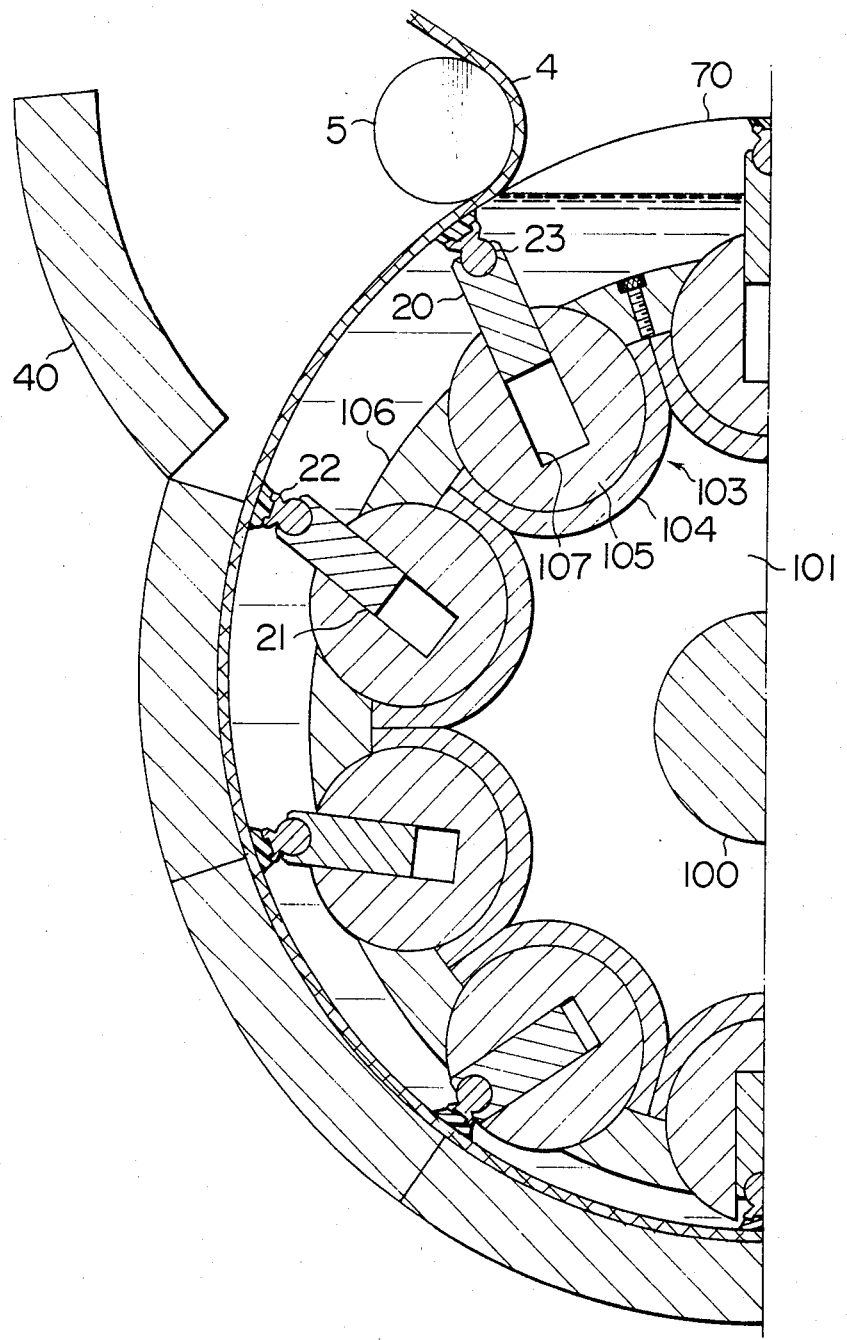
FIGS. 6 and 7 are cross-sectional views showing a relationship between the vane and the rotor of the embodiment.
Figure 7:
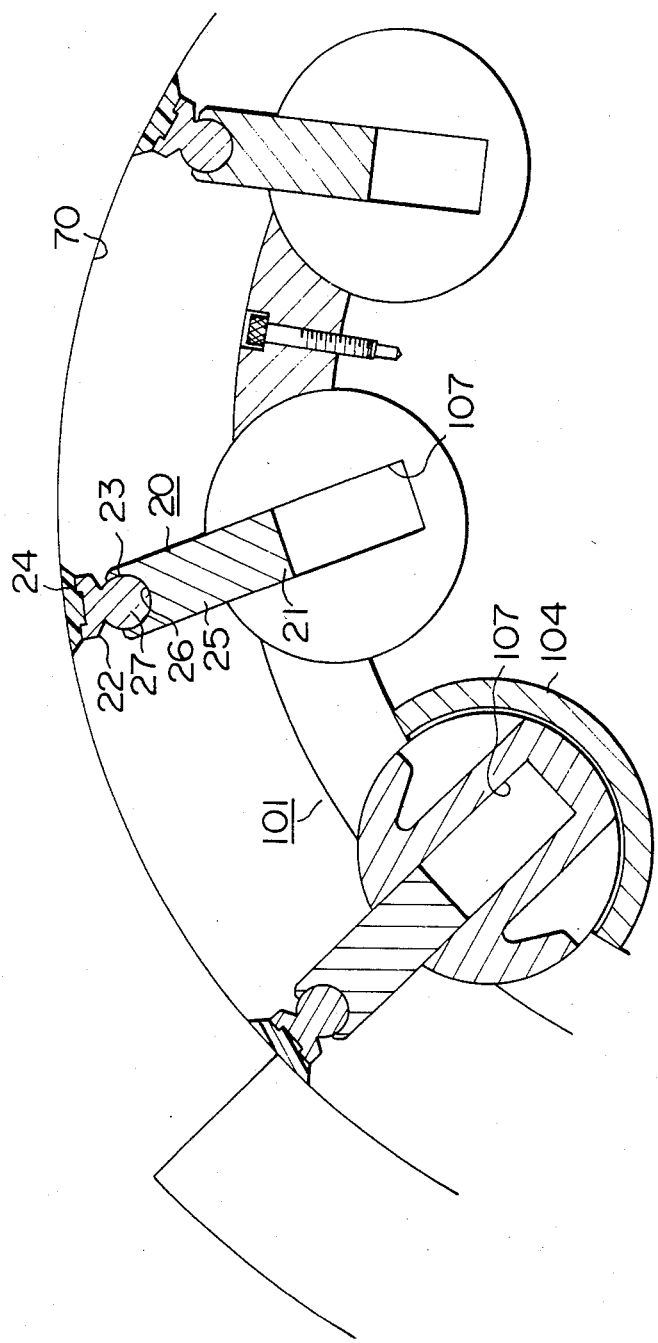

FIGS. 6 and 7 show cross-sectional views illustrating in detail the vanes 20 mounted on the rotor 101. Each vane 20 is constructed as follows. The tip end 22 of the plate-like vane 20 is rotatably coupled to the vane body through a connector 23 and a provided at its end extremity with a seal contact pad 24 for enhancing a sealability against the filter cloth 4 and against the inner surface of the frame segment 40 through the filter cloth 4. The connector 23 has a cylindrical portion 27 in the shape of a part of a cylinder rotatably engaged with a hollow space 26 in a shape of a part of a cylinder formed at one end of the plate-like body 25 of the vane 20. Also, the seal contact pad 24 provided at the tip end 22 is formed of elastic material and is in the form of a frustconical shape in cross section diverging toward the filter cloth 4. On the other hand, the base end 21 of the vane 20 is retractably and rotatably supported with respect to the cylindrical surface of the rotor 101 by means of the vane support 103 formed in the cylindrical surface of the rotor 101. More specifically, the vane support 103 comprises a semi-cylindrical support member 104 having therein a semi-cylindrical hollow space, a substantially cylindrical vane engagement member 105 rotatably disposed in the inner surface of the semicylindircal member 104, and a stop member 106 for preventing the vane engagement member 105 from being apart from the semi-cylindrical member 104. A guide groove 107 is formed in the vane engagement member 105 for retractably receiving the base end 21 of the vane 20. Such a semi-cylindrical support member 104 may be made by dividing a tubular member into two halves. Also, to reduce the weight of the vane engagement member 105, a part of its cylindrical portion may be removed to form a hollow space or the member may be formed of synthetic resin.

Figure 8:
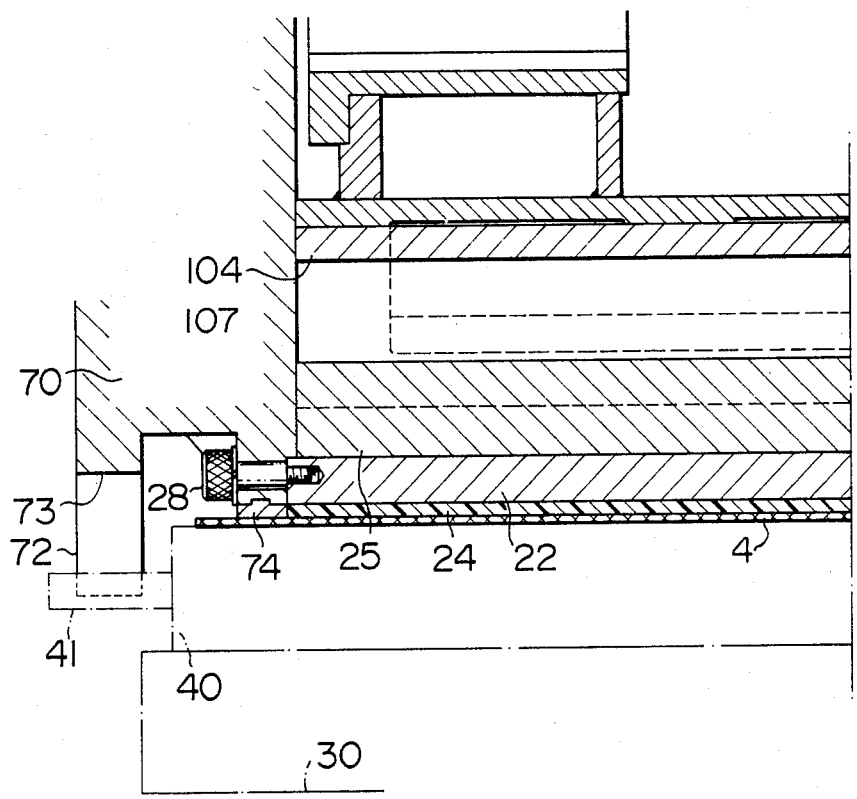
FIG. 8 is a cross-sectional view showing a relationship between the vane and the side plate of the embodiment.

Further explanation will be made with reference to FIG. 8. The tip end 22 of the vane 20 is secured through guide screws 28 to the side plates 70 provided at both ends of the rotor 101, whereby the seal contact pad 24 of the vane 20 is normally arranged in the radial direction. An annular seal member 74 made of an annular elastic member is mounted on the cylindrical surface of the side plate 70 and is in contact with the frame segment 40 through the filter cloth 4 thereby to prevent a leakage of the material to be processed out of the rotor 101. Each side plate 70 has a frame segment transfer portion 72 provided with engagement grooves 73 open in the radial direction. The frame segment transfer portion 72 is engaged in the engagement grooves 73 with engagement pins 41 provided on the opposed ends of each frame segment 40, whereby the frame segments 40 are synchronously moved in the rotational direction of the rotor 101 along the guide 30. In other words, by the action of the guide pins or screws 28 and the engagement pins 41, the tip end 22 of the vane 20, the frame segments 40, and the filter cloth 4 clamped between the tip end 22 of the vane 20 and the frame segments 40 are moved in mutual positional relations.

Figure 9:
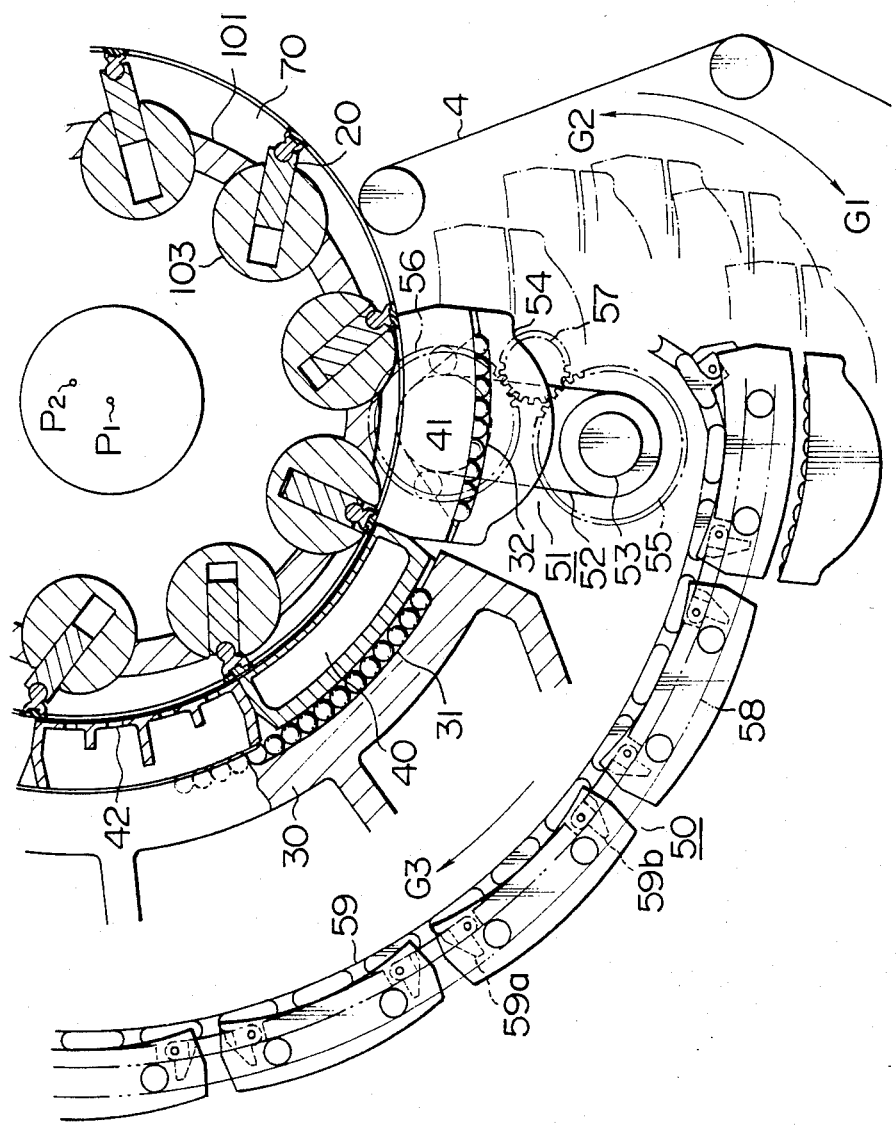
FIGS. 9 and 10 are views showing a guiding and supporting method of components constituting a guide of the embodiment.
Figure 10:
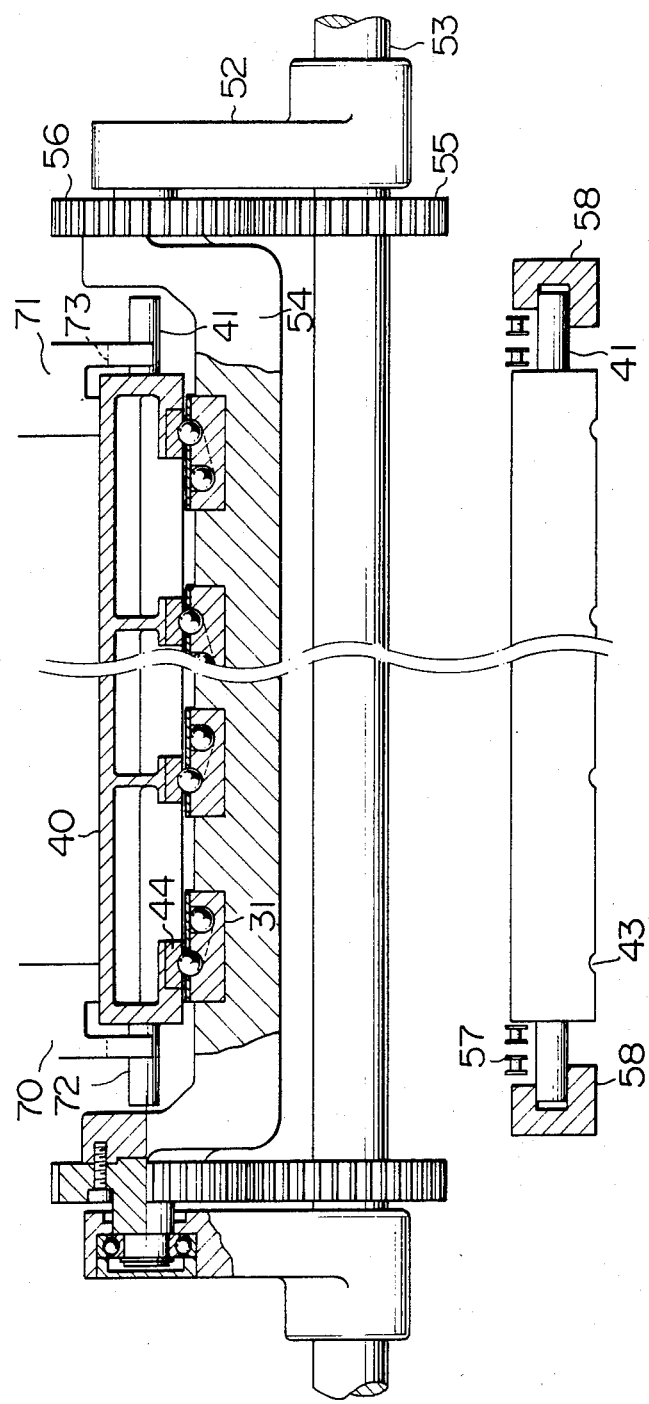

Further explanation will be made as to a guiding/supporting method of the frame segments 40 with reference to FIGS. 9 and 10. A number of throughholes 42 are formed in the inner surface of each frame segment 40 for allowing a discharge of filtered water or the like through the filter cloth 4 with ease. To facilitate the movement of the frame segments 40, a number of ball bearing means 31 are provided on the inner surface of the arcuate guide 30, and bearing metals 44 having recesses 43 for guiding the balls of the ball bearing means 31 are provided in the frame segment 40. The frame segment governing mechanism 51 for transferring the frame segments 40 includes the following components. An arm 52 is rotatably supported on a shaft 53 and has a gear 56 rotatably mounted at a forward end thereof. The gear 56 has a frame segment receiver 54 secured thereto, so that the gear 56 is rotatable with the frame segment receiver 54 as a unit. The stationary shaft 53 has secured thereto a gear 55 which is maintained in meshing engagement with the gear 56 through an intermediate gear 57 which is rotatably supported on the arm 52. Like the guide 30, the frame segment receiver 54 has a receiving surface of an arcuate shape for the frame segments 40, and is provided with a ball bearing means 32 to facilitate the movement of the frame segments 40. In the aforesaid construction, as the arm 52 is caused to rotate about the stationary shaft 53 rightwardly in FIG. 9, the frame segment receiver 54 mounted at the forward end of the arm 52 moves together with the arm 52. At this time, the gear 56 is rotated leftwardly through the intermediate gear 57, so that the rightward rotation of the gear 56 are caused to cancel each other out, with the result that the frame segment receiver 54 secured to the gear 56 moves without changing its posture. Thus, after riding on the frame segment receiver 54, each of the segments 40 is turned without changing its posture and engages lugs 59a and 59b of chain conveyors 59 to move to the starting end B. The guide chute 50 for the frame segments 40 comprises guide ways 58 engaging with and guiding the engagement pins 41 of the frame segments 40 and chain conveyors 59 for moving the segments 40 along the guide ways 58. Engagement lugs which engage with the engagement pins 41 of the frame segments 40 are provided on the chain conveyor 59 at a suitable interval for transferring to the starting end B of the guide 30 the frame segments 40 fed to the guide ways 58 by the segment receiver 54. More specifically, the chain conveyor 59 is provided with two kinds of engagement lugs 59a and 59b corresponding to the two engagement pins 41 formed on one of the opposed ends of the segment 40. The engagement lug 59a is not collapsible in the moving direction $G_3$ of the chain conveyor 59 but collapsible in the direction opposite to the moving direction $G_3$ whereas the engagement lug 59b is collapsible in the moving direction $G_3$ but not collapsible in the opposite direction to the moving direction of the chain conveyor 59. With such a construction, the frame segment 40 delivered from the terminal end of the guide 30 onto the segment receiver 54 of the segment mechanism 51 is passed to the guide chute 50 by rotating the arm 52 in the direction indicated by $G_1$ in FIG. 9. More specifically, the segment 40 disposed on the segment receiver 54 renders the engagement lug 59b of the chain conveyor 59 to be collapsed by abutment with its engagement pin 41 and is delivered into the guide ways 58 so that it is disposed between the two engagement lugs 59a, 59b. Thereafter, the arm 52 is rotated immediately in a reverse direction (indicated by $G_2$ in FIG. 9), the segment receiver 54 is returned to the initial position adjacent the terminal end C of the guide 30 where the segment receiver is ready for a subsequent transfer operation of the segment 40.

Although the segment governing mechanism 51 for the segments 40 provided at the terminal end C of the guide 30 has been explained, it will be seen that a segment governing mechanism having a like construction may be provided at the starting end B so that the segment taken out of the guide chute 50 may be repeatedly supplied along the guide 30.

Figure 11:
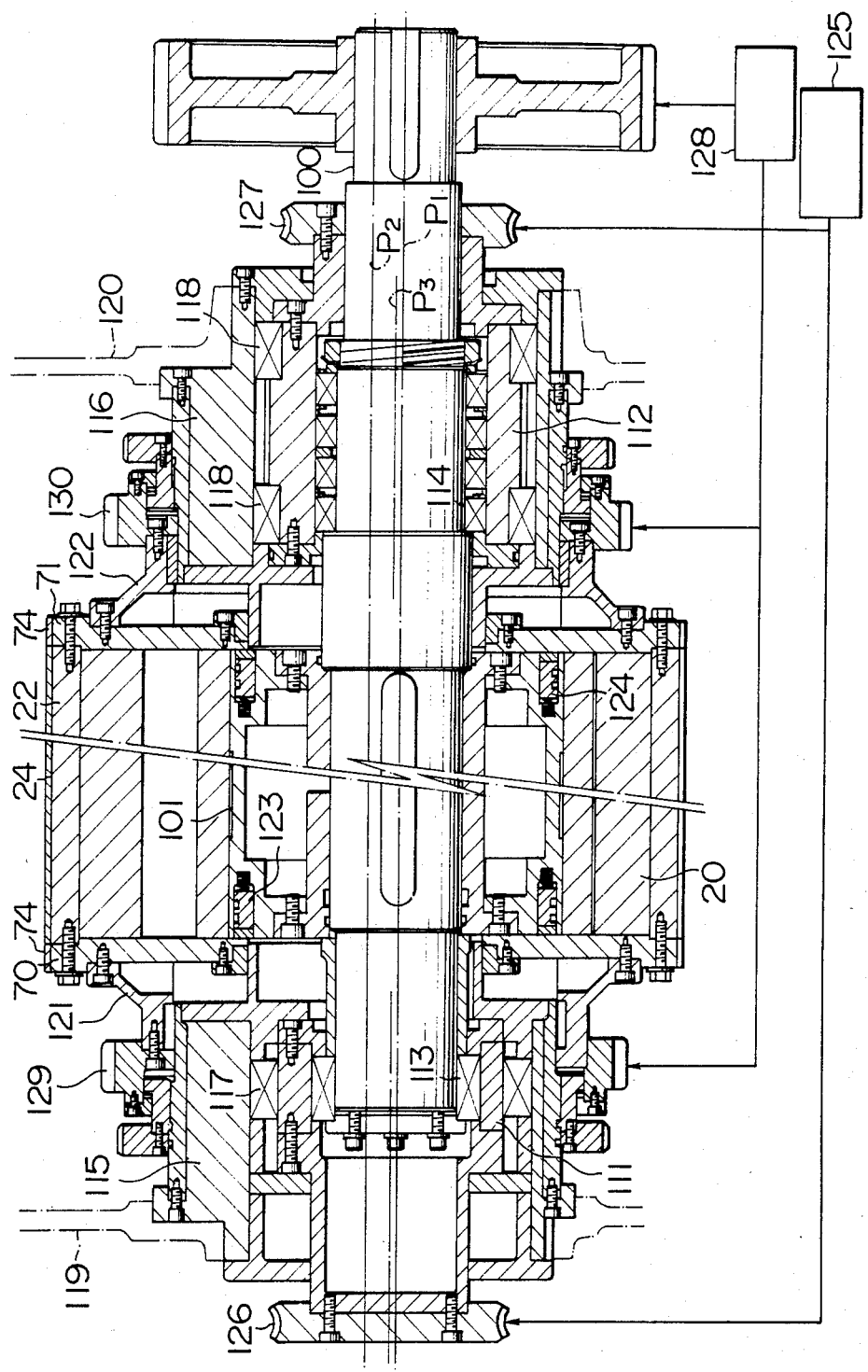
FIG. 11 is a cross-sectional view illustrating a construction of the rotor and the side plates of the embodiment.

More specific constructions of the rotor 101 and the side plates 70, 71 will be described with reference to FIG. 11. As described before, the rotor 101 is mounted on the rotary shaft 100, and the vane supports 103, vanes 20 and the like are assembled therewith in the aforesaid manner. The rotary shaft 100 and rotor 101 are rotated about the first center $P_1$. Eccentricity adjusting pieces 111, 112 are rotatably mounted on the rotary shaft 100 by roller bearings 113, 114, respectively. Outer cylindrical surfaces of the eccentricity adjusting pieces 111, 112 define cylinders having a third center $P_3$ which is eccentric with respect to the first center $P_1$. Main eccentric pieces 115, 116 are rotatably mounted on the eccentricity adjusting pieces 111 and 112 through roller bearings 117, 118. Outer cylindrical surfaces of the primary eccentric pieces 115, 116 define cylinders having the second center $P_2$ which is eccentric with respect to both the first and third centers $P_1$, $P_3$. It is convenient that the eccentricity between the first center $P_1$ and the second center $P_2$ is greater than that between the first center $P_1$ and the third center $P_3$.

The main eccentric pieces 115, 116 are supported by bases 119, 120. The side plates 70, 71 are provided on both sides of the rotor 101. The side plates 70, 71 are coupled to side plate guide mechanisms 121, 122 provided rotatably on the main eccentric pieces 115, 116, respectively. As a result, the side plates 70, 71 are rotated about the second center $P_2$ around which the outer cylindrical surfaces of the main eccentric pieces 115, 116 are rotated. Annular side seals 123, 124 are fitted in both end faces of the rotor 101. The seals 123, 124 are positioned radially inside of the vane 20 mounted on the rotor 101 and are adapted to come into contact with the facing surfaces of the side plates 70, 71 adjacent inner diameter portions thereof. Specifically, the sealing materials may be brought into contact with the side plates 70, 71 by using elastic members or spring members.

The apparatus further includes the following drive mechanism. An eccentricity adjusting means 125 is connected to gears 126, 127 coupled to the eccentrictiy adjusting pieces 111, 112 for rotating the pieces 111, 112 about the rotary shaft 100 for adjusting the eccentricity between the first center $P_1$ and the second center $P_2$. The eccentricity adjusting means 125 may comprise a suitable servomotor and an associated gear transmission mechanism. The eccentricity adjusting means 125 is normally rendered to be stopped but is operated when the state of the material to be processed is changed or it is desired to change the degree of treatment of the material to be processed, in order to adjust the eccentricity of the filtration/separation apparatus (the degree of decrease in volume of the space chamber A between the adjacent vanes 20 as the material is processed). A synchronizing means 128 is provided for driving the rotary shaft 100 and the side plates 70, 71 at the same rpm (the same angular speed) in the same direction. The mean 28 may comprise suitable motor, reduction gear means and gear transmission mechanism. Drives of the side plates 70, 71 are carried out through gears 129, 130 coupled to the side plate guide mechanisms 121, 122.

With such a construction, when the respective components are driven by the synchronizing means 128, the frame segments 40 disposed on the guide 30, the tip ends 22 of the vanes 20 and the filter cloth 4 clamped between the frame segments 40 and the tip ends 22 of the vanes 20 are moved from the starting end B to the terminal end C of the guide 30 in synchronism with the rotation of the side plates 70, 71 (without changing mutual positional relations). The space chamber A defined by the cylindrical surface of the rotor 101, the frame segments 40 disposed on the filter cloth 4, the adjacent vanes 20 and the side plates 70, 71 is, as it moves from the starting end B to the terminal end C, compressed gradually and decreases its volume. Accordingly, the material supplied in the space chamber A from the starting end B is dehydrated through the filter cloth 4 and the dehydrated material is taken out from the terminal end C. Through such an operation, the frame segments 40 moving on the guide 30, the tip ends 22 of the vanes 20 and the filter cloth 4 clamped therebetween are moved on the arc having the same rotational center (the second center $P_2$). Accordingly, since the distance L between the tip ends 22 of the adjacent vanes 20 contacting the filter cloth 4 is normally maintained constant, it is possible to continue the treatment without any change in the manner in which the tip ends contact the filter cloth 4 during the compression of the material to be treated, whereby a possible damage of the filter cloth 4 may be avoided and also the material to be treated is prevented from leakage from the higher pressure space chamber A to the lower pressure space chamber A.

In the above-described embodiment, the single frame segment 40 is disposed between the adjacent two vanes 20, and also, the junction portion of the adjacent frame segments 40 is positioned to face the seal contact pad 24 of the vane 20 by selecting the timing relation among the respective components. This is carried out because if the filter cloth 4 disposed on the junction portion of the adjacent frame segments 40 is subjected to a high pressure during the process, the junction portion might bite the filter cloth 4 so that the filter cloth 4 would be damaged. With such a construction, if dimensions of respective components are selected in such a manner that the seal contact pad 24 brings the filter cloth 4 into contact with frame segments 40 at a sufficient pressure during the process of the material, movement of the filter cloth 4 at the junction portion of the adjacent segments 40 is substantially prevented thereby to enable the filter cloth 4 not to be bitten into the junction portion.

In the above described embodiment, although the frame segments 40 are transferred by the frame segment transfer portions 72 provided to the side plates 70, 71, it is possible to synchronize the segments with the tip ends 22 of the vanes 20 by a timing belt or a chain well known per se. Also, although the mutual distance between the tip ends 22 of the vanes 20 is kept constant in the travelling path by utilizing the side plates 70, 71, this may be achieved by using suitable means such as guide way, timing belt or chain. Also, in the embodiment, the collapsable engagement lugs 59a, 59b are provided on the chain conveyor 59 of the frame segment guide chute 50, but such a construction is not necessarily required if the location of the chain conveyor 59 or the operation timing of the frame segment governing mechanism 51 is well selected. Also, in the embodiment, a number of frame segments are arranged on the chain conveyor 59, but it is possible to reduce the necessary number of the segments 40 by suitably selecting the operation timing of the frame segment governing mechanism 51 positioned at the starting end B or the terminal end C of the guide 30, the operating speed of the chain conveyor 59 and the timing of the chain conveyor 59. In view of cost or reduction of weight of the apparatus, it would be more available to design the frame segment feed-back device so as to reduce the necessary number of the segments 40. In other techniques, to simplify the frame segment feedback mechanism, the frame segments may be connected in an endless fashion, and may be folded back at the starting end B and the terminal end C of the guide 30.

Figure 12:
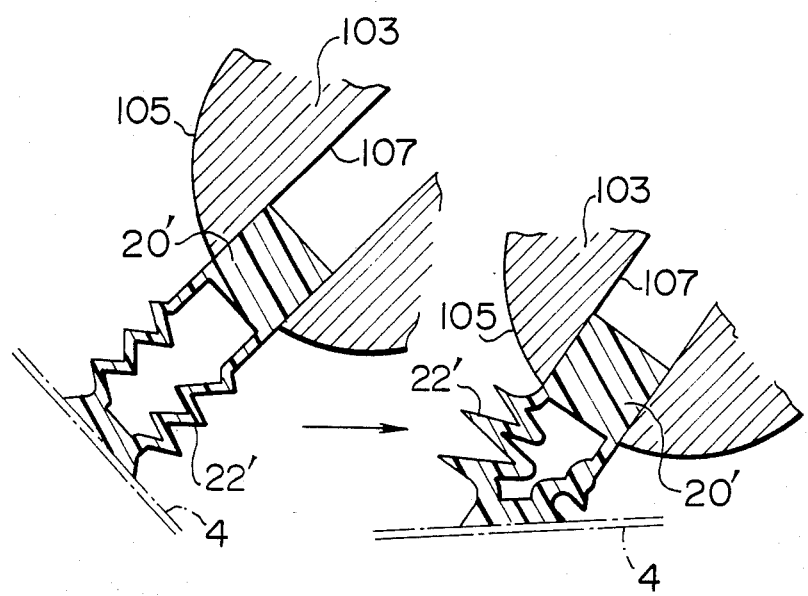
FIG. 12 is a schematic view illustrating a construction of vanes used in another embodiment of the invention.

Furthermore, in the embodiment, there are provided the vane supports 103 each rotatably supporting the base end 21 of the vane 20 and the connectors 23 each rotatably supporting the tip end 22 of the vane 20. However, applications of the invention are not limited to such specific construction. For instance, as shown in FIG. 12, another construction may be used. More specifically, a vane 20' is so constructed that the base end thereof is made rotatable and retractable with respect to the rotor 101 by the vane support 103 provided in the cylindrical surface of the rotor 101. The tip end of the vane 20' is made flexible or bendable by a bellows mechanism 22' made of elastic material. Also, if there is provided a similar bellows mechanism at the base end of the vane 20', the vane support 103 mounted in the rotor 101 may be dispensed with. In this case, the vane 20' would be also constructed such that the tip end of the vane 20' is not displaced in positional relation with the filter cloth 4 by the rotation of the rotor 101. Since a relatively high pressure differential is generated between the adjacent space chambers A partitioned by the vanes 20', a suitable rigidity must be imparted to the bendable portions of the vanes 20' to prevent the bellows mechanism 22' from inflating toward the lower pressure side.

Figure 13:
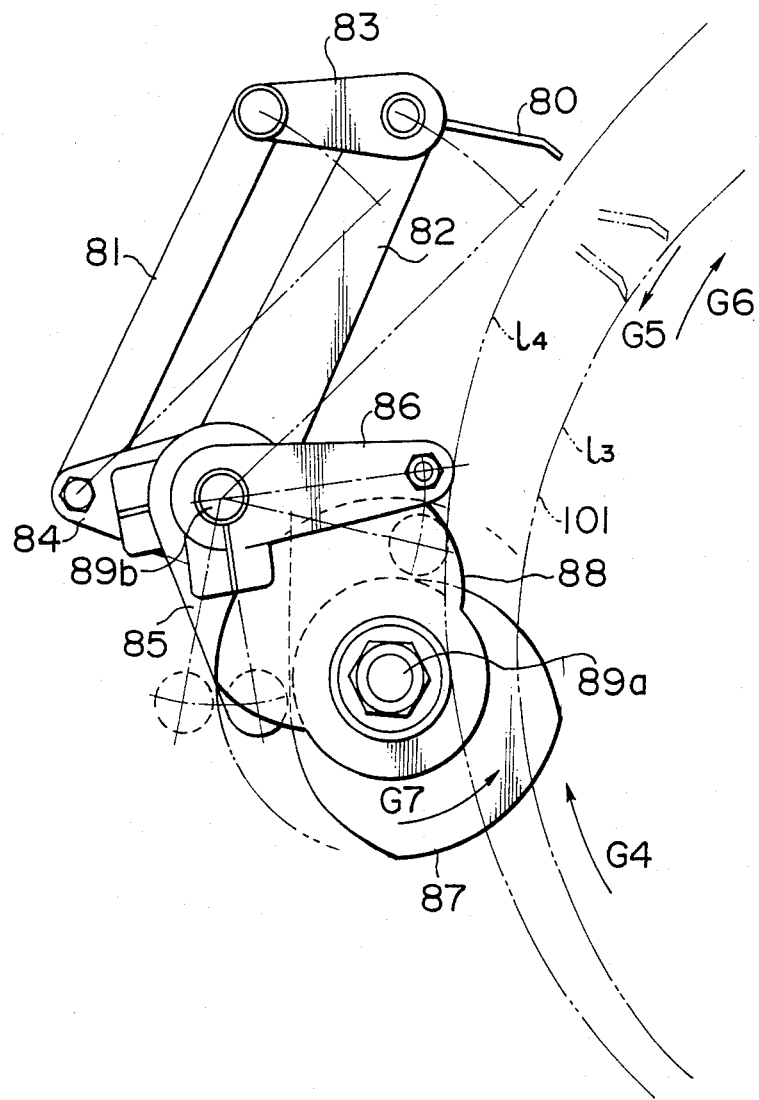
FIG. 13 is a schematic view of a device for scraping a material to be processed, used in the apparatus shown in FIG. 12.

In addition, an example of additional means mounted on the filtration/separation apparatus will be briefly described. FIG. 13 shows a scraping means for scraping off the material stuck on the cylindrical surface of the rotar 101, where $l_3$ is the locus or path of the rotar 101 and $l_4$ is the locus or path of the tip end of the vane 20. Namely, the scraping plate 80 must be moved away from the vane 20 upon passage of the vane 20 and serve to scrape the surface of the rotor 101 by moving in a direction $G_5$ opposite to the rotational direction $G_4$ of the rotor 101. To meet this requirement, as shown in FIG. 13, the scraping means comprises a parallel link mechanism consisting of links 81, 82, 83 and 84, a first link arm 85 connected to the link 84, a second link arm 85 connected to the link 82, a first cam 87 brought into contact with the free end of the first arm 85 and a second cam 88 brought into contact with the free end of the second arm 86. When the first and second cams 87, 88 are rotated about a shaft $89a$ in the direction indicated by $G_7$ in FIG. 13, the second arm 86 brought into contact with the second cam 88 is rotated about a shaft $89b$ so that the scraping plate 80 approaches the rotor 101. When the two cams 87, 88 are further rotated, the arm 85 brought into contact with the first cam 87 is rotated about the shaft $89b$, and the scraping plate 80 is rotated in the direction $G_5$ thereby achieving the scraping operation of the material to be processed. With further rotation of the second cam 88, when a larger diameter portion of the second cam 88 is brought into contact with the arm 86, the scraping plate 80 is moved away from the surface of the rotor 101. Also, since the arm 85 is brought into contact with a larger diameter portion of the first cam 87, the scraping plate 80 is rotated in a direction indicated by $G_6$ in FIG. 13 for being ready for the subsequent scraping operation. Thus, the operation of the scraping plate 80 is carried out in synchronism with the passage of the vane 20, so that the material to be processed, stuck on the surface of the rotor 101 may be effectively scraped off.

Also, since there is a fear that the filter cloth 4 supplied so as to be wound on a part of the cylindrical surface of the rotor 101 would be displaced widthwise during the operation, it is preferable to provide a guide means for compensating for such a displacement. To meet this requirement, hydraulic cylinders and associated link mechanisms are adapted to constitute a system for clamping the filter cloth 4 by two guide rollers, rotating these rollers, and at the same time moving the guide rollers in the widthwise direction of the filter cloth 4.

It is preferable to make the apparatus at a standstill after the operation of the filtration/separation apparatus, under the condition that the pressure applied to the vanes 20 be released. To meet this, it is possible to provide hydraulic cylinders and link mechanisms for allowing the guide 30 of the segments 40 to be extendable/retractable with respect to the rotor 101. Also, in the case where the filtration/separation apparatus is stopped, when the supply of the frame segments 40 from the starting end B is stopped, all the segments that are disposed on the guide 30 may be taken out, and the pressure applied to the vanes 20 may be released. Simultaneously, it is preferable to release or loosen the filter cloth 4 to relieve the tension applied thereto. Thus, the pressure and the tension applied to the respective components are relieved upon the stop of the operation whereby the damage of respective members or components may be minimized.

As described above, the present invention is applied to the separation apparatus for dehydrating the liquid material to be processed and taking out therefrom solid components for use, which is suitable for treatment of the material such as bean jam. If it is desired to filtrate the liquid material to be processed and take out liquid components for use as in treatment of bean milk, the apparatus may be also used as a filtration apparatus. Incidentally, it is understood that although the applications of the invention have been described as to the embodiments for treatment of foodstuffs such as bean jam, the invention may be similarly applied to the treatment of industrial waste material such as slurry and the like. Also, the present invention is applicable to the separation/filtration treatment for solid materials which are different from each another in size, by changing the kind of the filter cloth.

According to the invention, the filtration/separation apparatus comprises a filter cloth arranged to travel and face the rotor so that a partitioned space chamber defined by the cloth and the rotor is gradually narrowed in accordance with the rotation of the rotor, and vanes arranged to travel in such a manner that their tip ends are in contact with the filter cloth with their positional relations unchanged while their base ends are made retractable with respect to the rotor. Thus, in the compression of the material to be processed, the positional relations in contact between the filter cloth and the tip ends of the vanes are maintained constant, and therefore, an effective dehydration or separation treatment is achieved.

What is claimed is:

1. A continuous filtration/separation apparatus comprising:
   (a) a rotor mounted for rotation about a first center and having a cylindrical outer surface,
   (b) guide means having an inner surface arcuate about a second center which is eccentric with respect to said first center,
   (c) a plurality of frame segments mounted for travelling along the inner arcuate surface of said guide means in a direction in which a space between said guide means and said rotor is narrowed,
   (d) an endless filter cloth mounted for travelling between said plurality of frame segments and said rotor in a direction in which a space therebetween is narrowed,
   (e) a plurality of vanes each disposed retractably from and into the surface of said rotor and having a tip end brought into contact with said filter cloth always in a normal direction with respect to said filter cloth, said vanes each having bendable means between the tip end and a base end,
   (f) a supply port for supplying a material to be processed between said filter cloth and said rotor,
   (g) a take-out port for discharging the material, said take-out port being located at a position where the space between said guide means and said rotor is narrower than that of said supply port, and
   (h) a pair of side plates positioned at opposed end faces of said rotor for closing regions extending at lease from said supply port to said take-out port a viewed in a rotational direction of said rotor and defined by said frame segments and said rotor, said pair of side plates having said tip ends of said vanes fixed thereto.

2. The apparatus as recited in claim 1, wherein said bendable means comprises a hinge.

3. The apparatus as recited in claim 1, wherein said bendable means comprises an elastic member at the tip end of each vane.

4. The apparatus as recited in claim 1, wherein each of said vanes is brought at the tip end thereof into contact with said filter cloth straddling adjacent two frame segments.

5. The apparatus as recited in claim 1, wherein said bendable means includes a first bendable section and a second bendable section, said first bendable section being located within said rotor and said second bendable section being located at a portion which moves into and out of said rotor.

6. The apparatus as recited in claim 5, wherein said second bendable section is fixed to said side plates through an engagement member concentric with said second bendable section.

7. A continuous filtration/separation apparatus comprising:
   (a) a rotor mounted for rotation about a first center and having a cylindrical outer surface,
   (b) guide means having an inner surface arcuate about a second center which is eccentric with respect to said first center,
   (c) a plurality of frame segments mounted for travelling along the inner arcuate surface of said guide means in a direction in which a space between said guide means and said rotor is narrowed,
   (d) an endless filter cloth mounted for travelling between said plurality of frame segments and said rotor in a direction in which a space therebetween is narrowed,
   (e) a plurality of vanes each disposed retractably from and into the surface of said rotor and having a tip end brought into contact with said filter cloth always in a normal direction with respect to said filter cloth,
   (f) a supply port for supplying a material to be processed between said filter cloth and said rotor,
   (g) a take-out port for discharging the material, said take-out port being located at a position where the space between said guide means and said rotor is narrower than that of said supply port,
   (h) a pair of side plates positioned at opposed end faces of said rotor for closing regions extending at least from said supply port to said take-out port as viewed in a rotational direction of said rotor and defined by said frame segments and said rotor, said pair of side plates having said tip ends of said vanes fixed thereto, and
   (i) means for returning said frame segments from a terminal end of said guide means to a starting end thereof.

8. The apparatus as recited in claim 7, wherein said side plates comprised engagement transfer means in engagement with said segments.

9. A continuous filtration/separation apparatus comprising:
   (a) a rotor mounted for rotation about a first center and having a cylindrical outer surface,
   (b) guide means having an inner surface arcuate about a second center which is eccentric with respect to said first center,
   (c) a plurality of frame segments mounted for travelling along the inner arcuate surface of said guide means in a direction in which a space between said guide means and said rotor is narrowed,
   (d) an endless filter cloth mounted for travelling between said plurality of frame segments and said rotor in a direction in which a space therebetween is narrowed,
   (e) a plurality of vanes each disposed retractably from and into the surface of said rotor and having a tip end brought into contact with said filter cloth always in a normal direction with respect to said filter cloth,
   (f) a supply port for supplying a material to be processed between said filter cloth and said rotor,
   (g) a take-out port for discharging the material, said take-out port being located at a position where the space between said guide means and said rotor is narrower than that of said supply port,
   (h) a pair of side plates positioned at opposite end faces of said rotor for closing regions extending at lease from said supply port to said take-out port as viewed in a rotational direction of said rotor and defined by said frame segments and said rotor, said pair of side plates having said tip ends of said vanes fixed thereto,
   (i) a scraping plate having a free end toward the outer surface of said rotor, and
   (j) a scraping plate drive mechanism for bringing the scraping plate into contact with the outer surface of of said rotor, subsequently advancing said scraping plate in a direction opposite to the rotational direction of said rotor under the condition that said scraping plate is brought into contact with the outer surface of the rotor, and thereafter moving the scraping plate away from the outer surface of said rotor and moving said scraping plate in said rotational direction of said rotor.

10. The apparatus as recited in claim 9, wherein said scraping plate drive mechanism comprises a first drive unit including parallel link means having one link provided with said scraping plate, lever and cam means for moving said parallel link means about a support point so that said scraping plate is moved away from said rotor, and a second drive unit including lever and cam means for moving said parallel link means about the support point so that said scraping plate is moved in said rotational direction of said rotor and in the direction opposite to said rotational direction of the rotor.

* * * * *